Nov. 21, 1950     W. L. MORRISON, JR     2,530,534

PRESSURE COOKER AND PRESSURE REGULATOR THEREFOR

Filed June 25, 1947     2 Sheets-Sheet 1

INVENTOR.
WILLARD L. MORRISON, JR.
BY John W. Michael
ATTORNEY

Nov. 21, 1950     W. L. MORRISON, JR     2,530,534
PRESSURE COOKER AND PRESSURE REGULATOR THEREFOR
Filed June 25, 1947     2 Sheets-Sheet 2
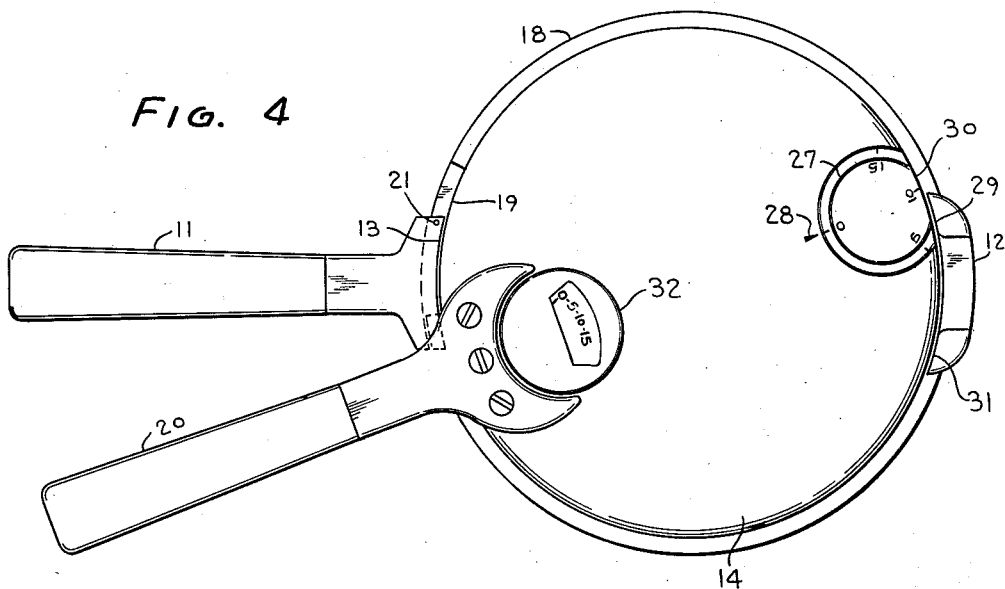
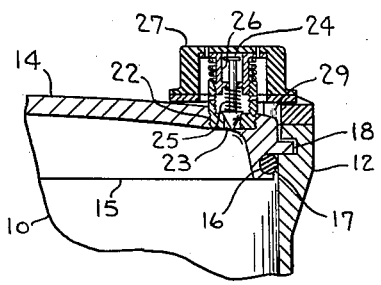
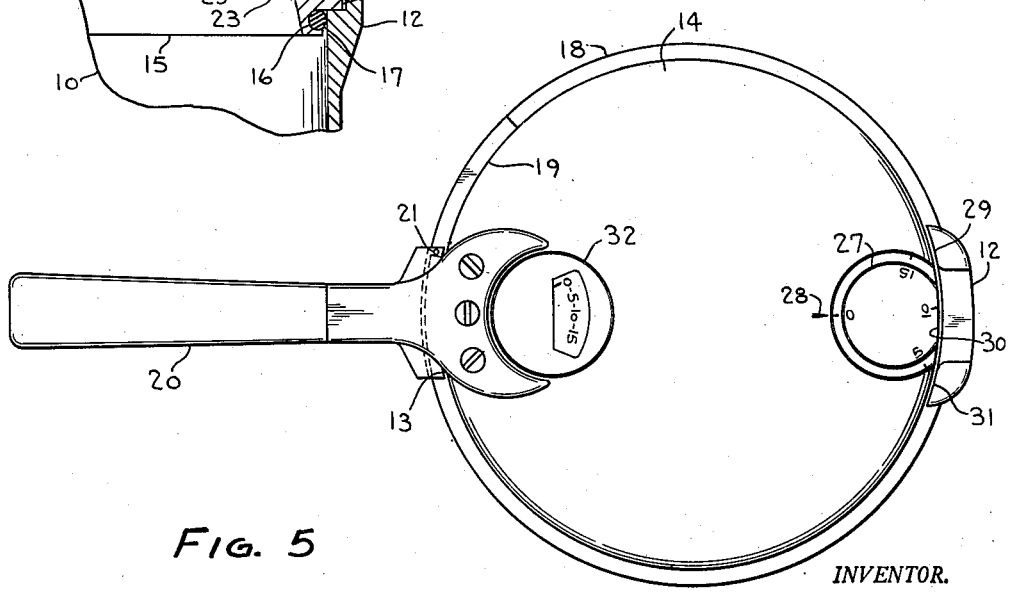
INVENTOR.
WILLARD L. MORRISON, JR.
BY John W. Michael
ATTORNEY Patented Nov. 21, 1950

2,530,534

UNITED STATES PATENT OFFICE 2,530,534

PRESSURE COOKER AND PRESSURE REGULATOR THEREFOR

Willard L. Morrison, Jr., West Bend, Wis., assignor to West Bend Aluminum Co., West Bend, Wis., a corporation of Wisconsin Application June 25, 1947, Serial No. 756,912

1 Claim. (Cl. 220—40)

This invention relates to improvements in pressure cookers particularly of the type adaptable for household use.

Pressure cookers of the type designed and intended for domestic use must be substantially fool-proof in operation. Often the user fails to complete the lock between the cover and the container, and after pressure builds up within the cooker the incomplete lock will break or otherwise become disengaged and the cover will fly off endangering nearby persons. There have been times when the user, contrary to directions, will disengage the lock between cover and container while there still remains greater than atmospheric pressure within the cooker. This likewise causes the cover to dangerously jump up from the container. Many times the user will misplace the separate weight which constitutes a part of the pressure selector and regulator valve and the temptation is present to plug the vent with any available means. This also creates a hazardous condition.

One object of this invention is to provide a pressure cooker the cover of which cannot be partially locked or unlocked unless the container is vented to atmosphere.

A still further object of this invention is to provide a pressure cooker in which the pressure selector member of the regulator valve is always attached to the cooker and is readily manipulated to obtain the selected pressure limit.

One way of obtaining these objects is to prevent the commencement of the locking or unlocking movement of the cover relative to the container unless the pressure regulator is vented to atmosphere or at zero pressure position and after such commencement to prevent the regulator from being changed from vented or zero position until the locking or unlocking is completed. A spring-actuated pressure regulator is used in which the pressure selector rotates through an arc from its zero position to highest pressure position. By placing the regulator near the edge of the cover, by providing an elongated abutment on the container which will lie in the path of travel of the pressure selector when the cover is rotated, and by providing the selector with an arcuate segment, the parts may be associated so that it will be necessary to move such selector to zero position so that the arcuate segment will clear the abutment and permit the cover to be placed on the container and commence its rotational locking movement. If the selector is not in zero position, the selector will contact the abutment and prevent the cover from being placed in the "to be locked" position or from being rotated toward locked position. Once the cover has been placed on the container and is ready to be rotated to locked position, it has to be rotated all the way to fully locked position before the arcuate segment will clear the abutment and permit the selector to be moved from zero position or venting position. Once in fully locked position, the cover cannot be rotated toward opened position unless the selector is at zero position because the selector will contact the abutment. To permit unlocking to take place the selector must again be moved to zero position at which position the arcuate segment will be in position to permit the selector to clear the abutment and the cover may be rotated to unlocked position.

The novel features, which are considered characteristic of the invention, are set forth with particularity in the appended claim. The invention itself, however, both as to its organization and its method of operation, together with additional objects and advantages thereof, will best be understood from the following description of a specific embodiment when read in connection with the accompanying drawings, in which:

Fig. 4 is a top plan view similar to Fig. 1 but with the cover shown part way between unlocked and locked position;

Fig. 5 is a top plan view similar to Fig. 1 with the cover shown in completely locked position;

Fig. 7 is fragmentary sectional view taken on the line 7—7 of Fig. 6.

Figure 1:
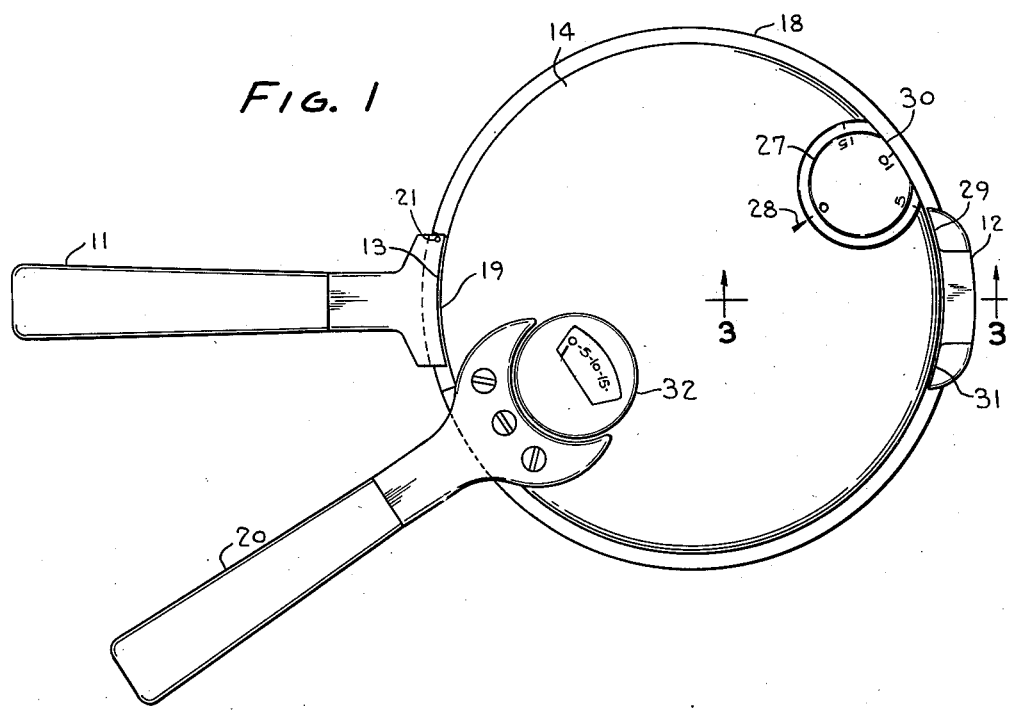
Fig. 1 is a top plan view of a pressure cooker and regulator embodying the present invention, with the cover shown on the container in its unlocked position.

Referring to the drawings by reference numerals, the pressure cooker comprises a container 10 which is provided with the customary handle 11 by which the container may be manipulated. The container 10 is provided at oppositely spaced portions with cover-holding or retaining lugs 12 and 13. The lug 13 is preferably (but not necessarily) formed at the juncture of the handle 11 with the wall of the container 10. Such position causes the pouring sides of the container to be free from any projections which would interfere with the normal emptying of the contents of the container. The purpose of these lugs 12 and 13 is to limit and restrain the upward movement of the cover member 14 under the influence of pressure above atmosphere generated within the container and their size is designed to provide adequate holding strength. The cover 14 is disk-like in shape and has a depending annular flange or skirt 15 which extends down within the container when the cover is positioned thereon. The external diameter of this flange is slightly less than the diameter of the interior of the vessel so as to have an easy fit therein. The outer wall of the flange 15 is provided with an encircling groove 16 into which is inserted a sealing ring 17 formed of rubber or other compressible and resilient materials. Its thickness is such that it extends slightly beyond the outer cylindrical surface of the flange 15 and provides a surface-to-surface contact with the interior of the vessel 10 when the cover is in position. With seals of this character it is not essential to press or clamp down the cover against the container to form the seal. As pressure greater than the atmosphere is generated within the container, the cover will rise until it abuts the lips of the lugs 12 and 13 and the seal between the sealing ring 17 and the vessel 10 will be increased by the action of the internal pressure. In order to prevent the cover from rising beyond the limits of the holding lugs 12 and 13, it is provided with a laterally extending rim 18. This rim 18 is provided with an opening 19 adjacent the handle 20. As shown in Figs. 1, 4 and 5, the opening 19 is spaced angularly clockwise from the juncture between the handle 20 and the cover 14. The opening 19, is of course, long enough to permit the lug 13 to pass therethrough. With this construction, to position the cover 14 on the container the handles 11 and 12 are relatively positioned as shown in Fig. 1, whereupon the rim 18 may be inserted under the lug 12 and the flange 15 positioned within the container 10. The handle side of the cover 14 may then be lowered so that the lug 13 passes through the opening 19 permitting the rim 18 to rest flush against the upper edge of the container 10. To lock the cover 14 the handle 20 is moved in a clockwise rotation relative to the container 10 until the handles are in substantial alinement as shown in Fig. 5. This causes the rim 18 to pass under the lug 13. A small pin 21 or other like abutment positioned on the upper edge of the container 10 adjacent the juncture of the handle 11 with said container will engage the edge of the rim 18 at the opening 19 to arrest the clockwise motion of the cover when the handles are in substantial alinement. When the cover has been fully rotated from the unlocked position shown in Fig. 1 to the fully locked position shown in Fig. 5, the full areas of the lugs 12 and 13 will have a surface-to-surface abutment with the rim 18 of the container when it is moved upwardly by internal pressure and will jointly act to keep the cover 14 from rising farther.

In order to selectively regulate pressures within the container there is provided a pressure regulator of standard design. It will, therefore, be described only generally. It comprises a body 22 which contains a vent 23. The body is threadedly secured in a threaded opening in the cover 14. A cone-shaped valve and stem 24 is contained within the body and is spring-biased by the spring 25 to closed position. The tension of the spring 25 is regulated by rotating the adjustment member 26 which is threadedly interconnected with the body 22. In order to provide a handle by which such rotation can be accomplished, and to provide means on which the pressure indicia may be carried, there is affixed to the adjustment member 26 a pressure selector 27. The rotation of the pressure member 27 through substantially 270° effects an adjustment of the regulator spring 25 so that it permits escape of steam from the vent 23 when the pressure has reached that amount of pounds per square inch (above atmospheric) indicated by the number of the pressure selector positioned opposite the arrowhead indicator 28. When the pressure selector 27 is rotated counter-clockwise to the zero indication shown in Figs. 1 and 4, the valve 24 is raised from the vent 23 and the regulator is in venting position. When in this position pressure will not be built up in the container. If, however, there is a pressure in the container when the regulator is moved to the zero position, such pressure will be rapidly dissipated.

Figure 2:
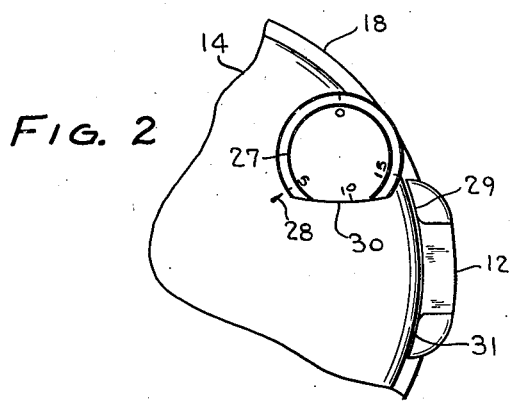
Fig. 2 is a fragmentary top plan view of such pressure cooker with the regulator in pressure-regulating position illustrating the manner in which the regulator prevents locking movement of the cover.
Figure 3:
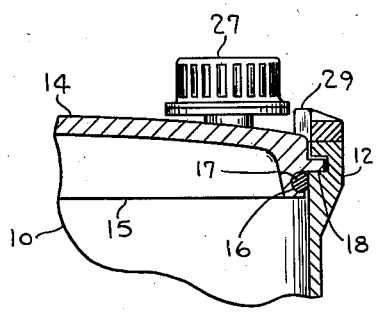
Fig. 3 is a fragmentary sectional view taken on the line 3—3 of Fig. 1.
Figure 6:
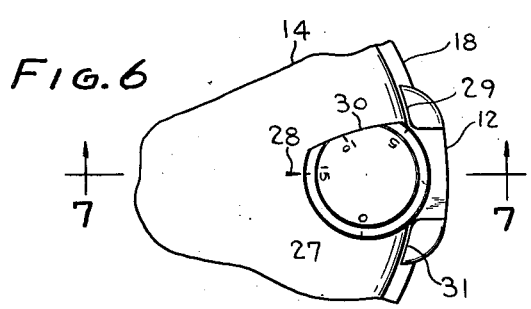
Fig. 6 is a fragmentary top plan view showing the clearance permitting the regulator to be rotatively operated to selected position when the cover is in closed position.

To prevent the cover from being moved from the unlocked position of Fig. 1 to the locked position of Fig. 5, or to a partially locked position therebetween such as is illustrated in Fig. 4, the pressure selector 27 is positioned so that it will strike an elongated abutment 29. To this end it is positioned near the periphery of the top of the cover 14 and its circumferential margin extends therebeyond into substantial concentricity with the circumference of the flange 18 (see Fig. 2). The abutment 29 is positioned on the lug 12 and also overlies the flange 18. Hence the circumference of the pressure selector 27 and the abutment 29 normally contact each other to prevent the cover 14 from rotating with respect to the container 10. However, the selector 27 is provided with an arcuate segment 30 which in zero position of the selector is also in substantial concentricity with the periphery of the top of the cover 14. The position of the selector 27 angularly with respect to the unlocked position of the cover 14 and the angular position of the abutment 29 is such that when the cover 14 is in the unlocked position shown in Fig. 1 the circumference of the selector 27 will be substantially adjacent to the counter-clockwise edge of the elongated abutment 29. When in this position the cover 14 may not be rotated clockwise from its unlocked position unless the pressure selector is at zero and the arcuate segment 30 substantially in alinement with the circumference of the top of the cover 14. If the selector 27 is rotated clockwise from such zero position to a position such as is illustrated in Fig. 2, the periphery of the selector 27 will strike against the counter-clockwise edge of the abutment 30 and prevent rotation of the cover 14. However, when the selector 27 is in the zero position there will be a clearance between the arcuate segment 30 and the abutment 29 as is clearly shown in Fig. 4, and the cover 14 may be rotated from unlocked position to locked position. The length of the elongated abutment 29 is such that when the cover is in the locked position shown in Fig. 5, the periphery of the pressure selector 27 will then be adjacent to the clockwise end of such abutment. In this position the selector 27, as is illustrated in Fig. 6, may be rotated from the zero position to other selected positions. However, unless the selector 27 is in the zero position, its periphery will strike the abutment 29 and prevent any counter-clockwise rotation of the cover from the fully locked position. It is necessary to move the selector 27 to zero position in order to rotate the cover from the locked position toward unlocked position. It is apparent, therefore, that the cover may not be rotated from either unlocked position or locked position unless the interior is vented to atmosphere.

A member 31, symmetrically shaped with respect thereto and oppositely positioned from the elongated abutment 29, may also be placed on the lug 12 to lend a pleasing appearance. However, it performs no functional operation. In some instances it is also preferable to have a pressure gauge 32 of the visible type which acts as a check upon the pressure regulator and permits fine adjustment thereof in accordance with the actual pressures within the pressure cooker.

This application is intended to cover such changes and modifications as come within the spirit of the invention or the scope of the following claim.

I claim:

A pressure cooker comprising a container, a cover for said container, means for locking said cover to said container which requires relative motion between said cover and said container from an unlocked position on said container to a locked position on said container including an elongated lug on said container and a laterally extending rim on said cover which in the locked position of said cover extends below said lug, an abutment carried by said lug and overlying said rim, and a revolvable pressure regulator on said cover and having a circumferential portion normally overlying said flange and being in abuttable relationship with said abutment to prevent said cover from rotating from one to the other of said unlocked or locked positions, said regulator having an arcuate segment spaced from and non-abuttable with said lug when said regulator is in venting position whereby said cover may be relatively rotated with respect to said container when said regualtor is in venting position.

WILLARD L. MORRISON, Jr.

REFERENCES CITED

The following references are of record in the file of this patent:

UNITED STATES PATENTS

| Number | Name | Date |
|---|---|---|
| 619,233 | Schraudner | Feb. 7, 1899 |
| 1,361,946 | Whitaker | Dec. 14, 1920 |
| 1,534,131 | McBride | Apr. 21, 1925 |
| 2,436,566 | Goldberg | Feb. 24, 1948 |

FOREIGN PATENTS

| Number | Country | Date |
|---|---|---|
| 874,691 | France | May 18, 1942 |